(12) United States Patent
Kim (10) Patent No.: US 8,494,057 B2
(45) Date of Patent: Jul. 23, 2013

(54) VIDEO ENCODING APPARATUS AND METHOD

(75) Inventor: Jung-Tae Kim, Cheonan-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 300 days.

(21) Appl. No.: 12/915,453

(22) Filed: Oct. 29, 2010

(65) Prior Publication Data

US 2011/0103483 A1    May 5, 2011

(30) Foreign Application Priority Data

Oct. 30, 2009    (KR) .................. 10-2009-0103890

(51) Int. Cl.
*H04N 7/12*    (2006.01)
(52) U.S. Cl.
USPC ....................................... 375/240.16
(58) Field of Classification Search
USPC ..................... 375/240.01–240.29
See application file for complete search history.

(56) References Cited

U.S. PATENT DOCUMENTS

| | | | | |
|---|---|---|---|---|
| 5,343,247 | A * | 8/1994 | Vogel | 375/240.16 |
| 5,790,195 | A * | 8/1998 | Ohsawa | 348/419.1 |
| 2005/0123038 | A1* | 6/2005 | Otsuka et al. | 375/240.03 |
| 2008/0056389 | A1* | 3/2008 | Chiang et al. | 375/240.29 |
| 2009/0016443 | A1* | 1/2009 | Kim et al. | 375/240.24 |
| 2009/0252221 | A1* | 10/2009 | Park et al. | 375/240.12 |

FOREIGN PATENT DOCUMENTS

| | | |
|---|---|---|
| JP | 2005-175627 A | 6/2005 |
| KR | 10-2005-0115779 A | 12/2005 |
| KR | 10-2005-0119422 A | 12/2005 |

* cited by examiner

*Primary Examiner* — Richard Torrente
(74) *Attorney, Agent, or Firm* — Lee & Morse, P.C.

(57) ABSTRACT

A video encoding apparatus includes a motion estimation module, an information providing module, a filtering module, a motion compensation module, and a converting module. The motion estimation module performs a plurality of modes of motion estimations on macro-blocks included in an input frame and provides a motion-estimated frame which conforms to a predetermined standard. The information providing module receives motion vectors and mode information of the plurality of modes of motion estimations to provide an encoding information signal. The filtering module filters the motion-estimated frame to provide a filtered frame based on the encoding information signal. The motion compensation module performs motion compensation on the filtered frame to provide a motion-compensated frame. The converting module performs a spatial conversion on the motion-compensated frame.

15 Claims, 8 Drawing Sheets

VIDEO ENCODING APPARATUS AND METHOD

BACKGROUND

1. Field

Example embodiments relate to encoding and, more particularly, to video encoding apparatus and a video encoding method.

2. Description of the Related Art

As information communication over the interne increases, video communication, in addition to voice communication, increases. To satisfy increasing demands of consumers for text, images, music, and so forth, demands on multimedia services increases. Multimedia includes huge amount of data, requiring a large capacity storage media. In addition, transmission of multimedia data requires wide bandwidth. Therefore, compressive encoding is essential for transmitting multimedia data.

SUMMARY

Embodiments are therefore directed to a video encoding apparatus and method, which substantially overcomes one or more of the problems due to the limitations and disadvantages of the related art.

It is therefore a feature of an embodiment to provide a video encoding apparatus and method having enhanced performance using additional encoding information.

It is yet another feature of an embodiment to provide video encoding apparatus and method that prevent bit rates from increasing by including a filter inside the video encoding apparatus and using additional encoding information.

It is still therefore a feature of an embodiment to provide video encoding apparatus and method that prevent image quality from being degraded by including a filter inside the video encoding apparatus and using additional encoding information.

At least one of the above and other features and advantages may be realized by providing a video encoding apparatus including a motion estimation module, an information providing module, a filtering module, a motion compensation module, and a converting module. The motion estimation module performs a plurality of modes of motion estimations on macro-blocks included in an input frame and provides a motion-estimated frame which conforms to a predetermined standard. The information providing module receives motion vectors and mode information of the plurality of modes of motion estimations to provide an encoding information signal. The filtering module filters the motion-estimated frame to provide a filtered frame based on the encoding information signal. The motion compensation module performs motion compensation on the filtered frame to provide a motion-compensated frame. The converting module performs spatial conversion on the motion-compensated frame.

The predetermined standard may be associated with each cost of the plurality of modes of motion estimations preformed on the macro-blocks.

The cost of the mode of motion estimation conforming to the predetermined standard may be lower than costs of other modes of motion estimations.

The plurality of modes of motion estimations may be performed by referring to a reference frame.

The motion estimation module may include a motion estimation unit that performs the plurality of modes of motion estimations on each of the macro-blocks by referring corresponding blocks of the reference frame to generate corresponding motion vectors and a mode decision unit that decides which one of the modes conforms to the predetermined standard.

The encoding information signal may include at least the motion vectors, the mode information, a partition type of the macro-blocks, a type of the macro-blocks, and a quantization parameter of the macro-blocks.

The filtering module may include a two dimensional filter that filters the motion-estimated frame in two dimensions, a multiplexer that selects one of the motion-estimated frame and an output of the two dimensional filter in response to the encoding information signal, a switch that selectively provides the reference frame according to the encoding information signal, and a coupler that selectively couples the output of the multiplexer and the reference frame which is selectively provided, to provide the filtered frame according to the encoding information signal.

The multiplexer may select the output of the two dimensional filter, the switch is opened and the coupler provides output of the two dimensional filter when the encoding information signal indicates an intra-mode.

When the encoding information signal indicates an intermode, the multiplexer may select the motion-estimated frame, the switch may be closed, and the coupler may provide a frame in which the motion-estimated frame is coupled with the reference frame as the filtered frame The motion estimation module and the filtering module may operate as a third-dimensional noise canceller when the motion estimation module and the filtering module are coupled to each other.

The filtering module may include a two dimensional filter that filters the motion-estimated frame in two dimensions, a multiplexer that selects one of the motion-estimated frame and an output of the two dimensional filter in response to the encoding information signal, a buffer that stores the reference frame to selectively provide the stored reference frame according to the encoding information signal, and a coupler that selectively couples the output of the multiplexer and the reference frame which is selectively provided, to provide the filtered frame according to the encoding information signal.

The converting module may include a discrete cosine transformation (DCT) unit that performs DCT on the motion-estimated frame to generate a DCT coefficient and a quantization unit that performs quantization on the DCT coefficient to generate a quantization coefficient.

The video encoding apparatus may further include a recovery module that recovers the spatial-converted frame to provide a recovered frame and a storage unit that stores the recovered frame to provide the stored recovered frame as the reference frame.

The recovery module may include an inverse quantization unit that performs the inverse quantization on the spatial converted frame and an inverse discrete cosine transformation that performs the inverse discrete cosine transformation on the inversely quantized frame to provide the recovered frame.

According to example embodiments, in a video encoding method, a plurality of modes of motion estimations is performed on macro-blocks included in an input frame by referring to a reference frame to provide a motion-estimated frame which conforms to a predetermined standard. The motion-estimated frame is filtered to provide a filtered frame according to an encoding information signal including motion vectors of the plurality of modes of motion estimations and mode information of the plurality of modes of motion estimations.

Motion compensation is performed on the filtered frame. Spatial conversion is performed on the motion-compensated frame.

The predetermined standard may be associated with each cost of the plurality of modes of motion estimations preformed on the macro-blocks.

The spatial conversion may be performed on the motion-compensated frame for canceling spatial overlap in the motion-compensated frame.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Korean Patent Application No. 10-2009-0103890, filed on Oct. 30, 2009, in the Korean Intellectual Property Office, and entitled: "Video Encoding Apparatus and Method," is incorporated by reference herein in its entirety.

Various example embodiments will be described more fully hereinafter with reference to the accompanying drawings, in which some example embodiments are shown. The present inventive concept may, however, be embodied in many different forms and should not be construed as limited to the example embodiments set forth herein. Rather, these example embodiments are provided so that this disclosure will be thorough and complete, and will fully convey the scope of the present inventive concept to those skilled in the art. In the drawings, the sizes and relative sizes of layers and regions may be exaggerated for clarity. Like numerals refer to like elements throughout.

It will be understood that, although the terms first, second, third, etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
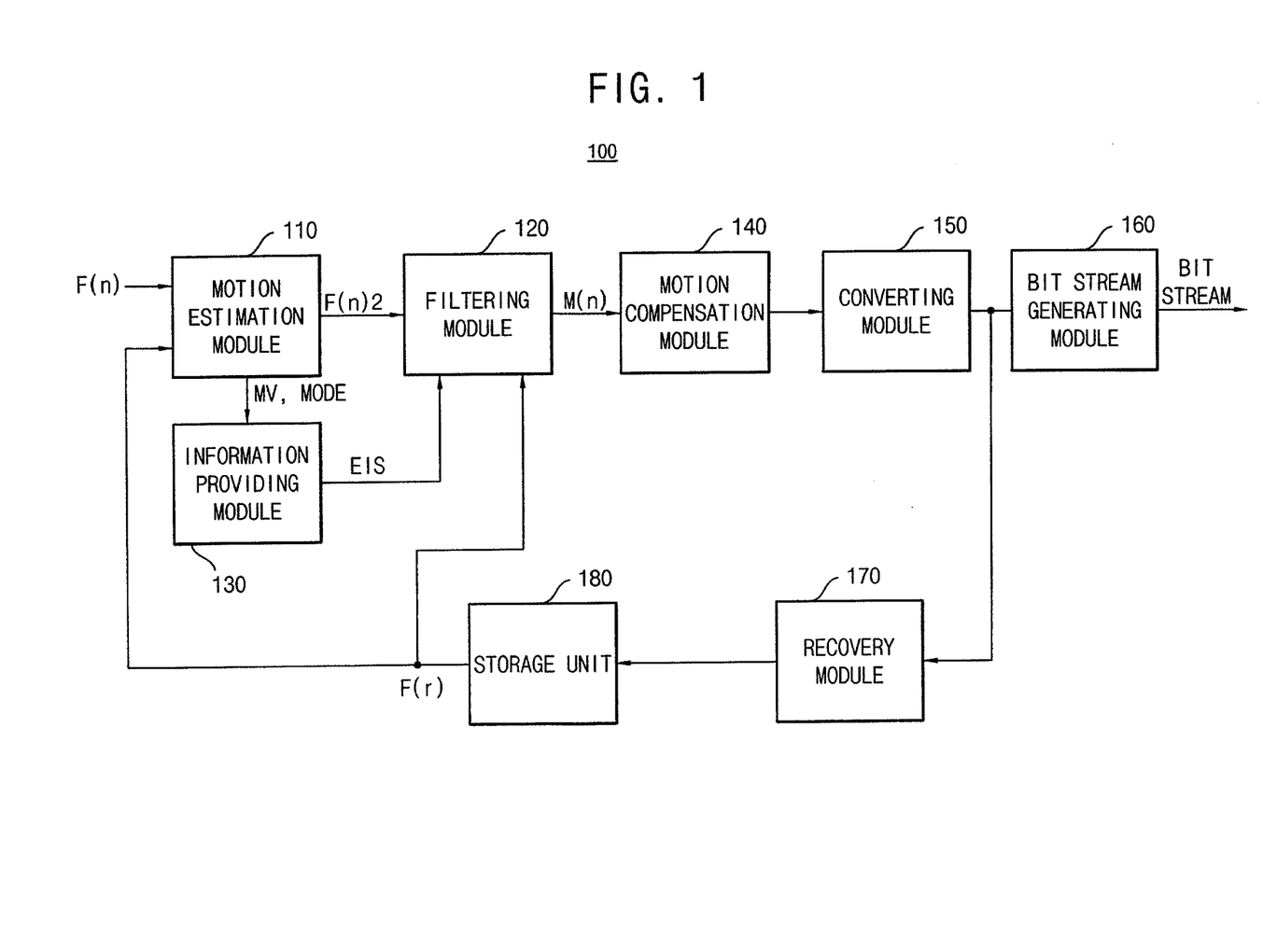
FIG. 1 illustrates a block diagram of a video encoding apparatus according to some example embodiments.

FIG. 1 illustrates a block diagram a video encoding apparatus 100 according to some example embodiments. Referring to FIG. 1, the video encoding apparatus 100 may include a motion estimation module 110, a filtering module 120, an information providing module 130, a motion compensation module 140, a converting module 150, a bit stream generating module 160, a recovery module 170, and a storage unit 180.

The motion estimation module 110 performs a plurality of modes (inter-mode, intra-mode, etc.) of motion estimations on macro-blocks included in an input frame F(n) by referring to a reference frame F(r) provided from the storage unit 180 and provides a motion-estimated frame F(n)2, which conforms to a predetermined standard. The predetermined standard may be associated with each cost of the plurality of modes of motion estimations preformed on the macro-blocks. The cost of the motion estimation conforming to the predetermined standard may be lower than the costs of other modes of motion estimations. The cost of each mode of motion estimation may be determined based on a cost function.

The information providing module 130 receives motion vectors MV and mode information MODE of the plurality of modes of motion estimations to provide an encoding information signal EIS. The encoding information signal EIS may include at least the motion vectors, the mode information, a partition type of the macro-blocks, a type (inter, intra, etc) of the macro-blocks, and a quantization parameter of the macro-blocks.

The filtering module 120 filters the motion-estimated frame F(n)2 from the motion estimation module 110 to provide a filtered frame M(n) based on the encoding information signal EIS.

The motion compensation module 140 performs a motion compensation on the filtered frame M(n) to provide a motion-compensated frame. The converting module 150 performs a spatial conversion on the motion-compensated frame. The bit stream generating module 160 generates a bit stream BIT STREAM including the spatial-converted and motion-compensated frame, the motion frames, and a number of the reference frame.

The recovery module 170 recovers the spatial-converted frame to provide a recovered frame. The storage unit 180 stores the recovered frame and provides the recovered frame as the reference frame F(r).

Figure 2:
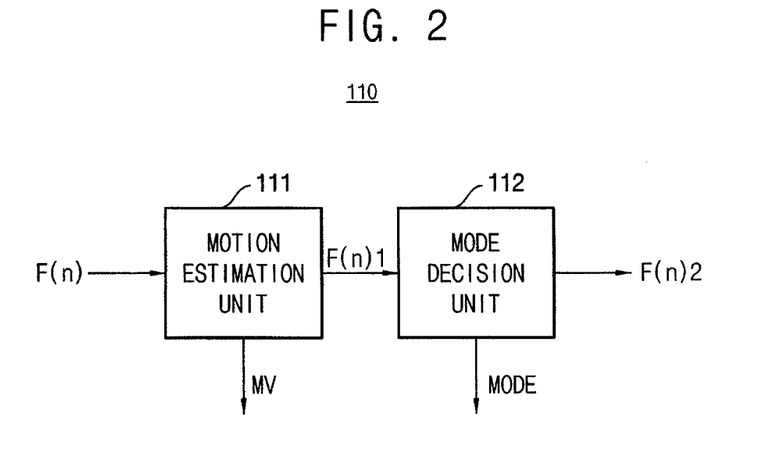
FIG. 2 illustrates a block diagram of an example of the motion estimation module in FIG. 1 according to some example embodiments.

FIG. 2 illustrates a block diagram of an example of the motion estimation module 110 in FIG. 1 according to some example embodiments. Referring to FIG. 2, the motion estimation module 110 includes a motion estimation unit 111 and a mode decision unit 112.

The motion estimation unit 111 performs the plurality of modes of motion estimations on each of the macro-blocks of the input frame F(n) by referring corresponding blocks of the reference frame to generate corresponding motion vectors MV. The mode decision unit 112 decides which one of the plurality of modes of motion-estimated frames F(n)1 conforms to the predetermined standard. That is, the mode decision unit 112 decides which one of the plurality of modes of motion-estimated frames F(n)1 costs less than other modes. For example, when inter-mode motion estimations are performed on each of the macro-blocks of the input frame F(n), a motion vector is generated by searching for a region that is similar to the current macro-block to be encoded in at least one reference frame that precedes or follows the current input frame F(n) to be encoded. For example, when intra-mode motion estimations are performed on each of the macro-blocks of the input frame F(n), a prediction value of a current block to be encoded is computed using pixel values of pixels located around the current macro-block, and a difference between the prediction value and an actual pixel value of the current macro-block is encoded.

Figure 3:
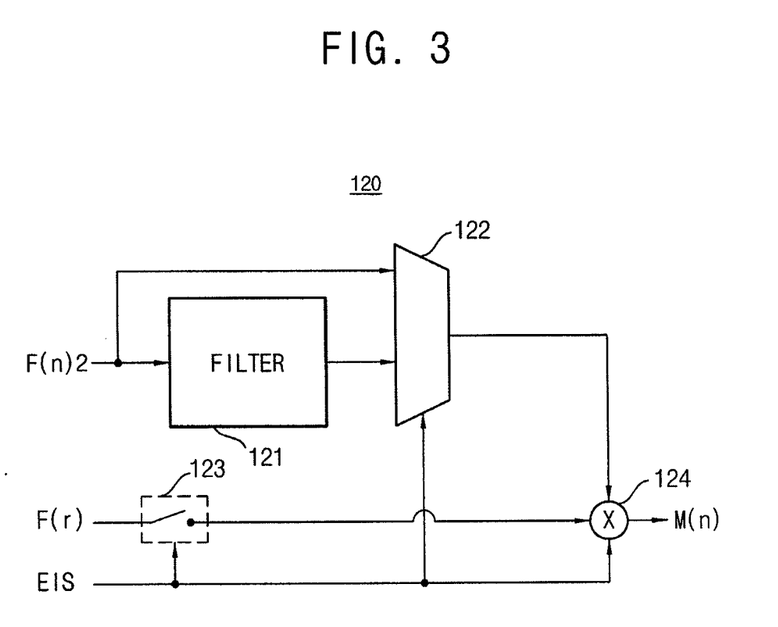
FIG. 3 illustrates an example of the filtering module in FIG. 1 according to some example embodiments.

FIG. 3 illustrates an example of the filtering module 120 in FIG. 1 according to some example embodiments. Referring to FIG. 3, the filtering module 120 includes a two dimensional filter 121, a multiplexer 122, a switch 123, and a coupler 124.

The two dimensional filter 121 filters the motion-estimated frame F(n)2 in two dimensions. The multiplexer 122 selects one of the motion-estimated frame F(n)2 and an output of the two dimensional filter 121 in response to the encoding information signal EIS. The switch 123 selectively provides the reference frame F(r) according to the encoding information signal EIS. The coupler 124 selectively couples the output of the multiplexer 122 and the reference frame F(r) which is selectively provided, to provide the filtered frame M(n) according to the encoding information signal EIS. For example, the multiplexer 122 selects the output of the two dimensional filter 121, the switch 123 is opened and the coupler 124 provides the output of the two dimensional filter 121 when the encoding information signal EIS indicates an intra-mode. That is, the motion compensation module 140 calculates a difference prediction value using adjacent pixels of the macro-block to be encoded and actual pixel values. For example, the multiplexer 122 selects the motion-estimated frame F(n)2, the switch 123 is closed, and the coupler 124 provides a frame in which the motion-estimated frame F(n)2 is coupled with the reference frame F(r) as the filtered frame M(n) when the encoding information signal EIS indicates an inter-mode. The motion compensation module 140 calculates a difference between a prediction block using a motion vector generated in the motion estimation module 110 and a current block. That is, the filtering module 120 combined with the motion estimation module 110 operate as a third dimensional noise canceller.

Figure 4:
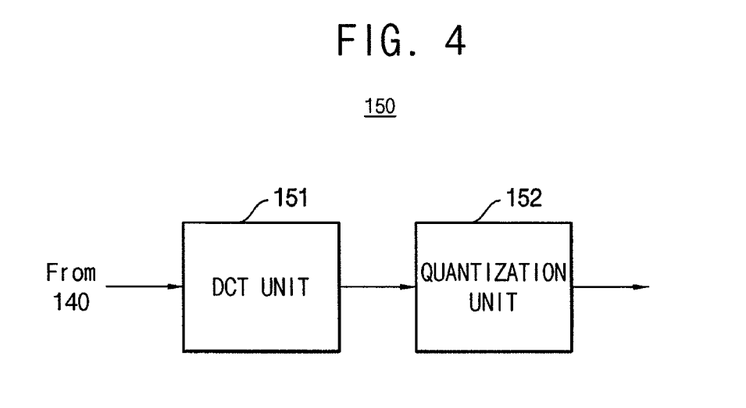
FIG. 4 illustrates a block diagram of an example of the converting module in FIG. 1 according to some example embodiments.

FIG. 4 illustrates a block diagram of an example of the converting module 150 in FIG. 1 according to some example embodiments. Referring to FIG. 4, the converting module 150 includes a discrete cosine transformation (DCT) unit 151 and a quantization unit 152.

The DCT unit 151 performs DCT on the motion-compensated frame to generate DCT coefficients. The DCT coefficients may be real numbers. The quantization unit 152 performs quantization on the DCT coefficients to generate quantization coefficients. The quantization coefficients may be integers. When a difference of an input frame and a prediction frame is great, the quantization coefficients may be made small, such that much data are encoded. When a difference of the input frame and the prediction frame is small, the quantization coefficients may be made great, such that less data are encoded.

The quantization coefficients are provided to the bit stream generating module 160, and the bit stream generating module 160 generate the bit stream BIT STREAM including the spatial-converted frame, the motion vectors and a number of the reference frame. The converting module 150 may include a wavelet converter instead of the DCT unit 151. The DCT unit 151 may cancel spatial overlap of the motion-compensated frame. The quantization coefficients may be entropy-encoded by an entropy coding module (not illustrated) to be provided to the bit stream generating module 160. The coded frame, the motion vectors, encoding information and a required header are bit-streamed in the stream generating module 160.

Figure 5:
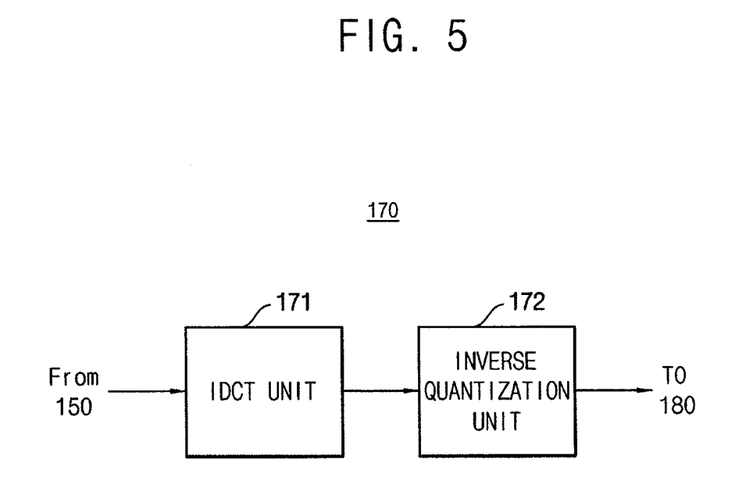
FIG. 5 illustrates a block diagram of an example of a recovery module in FIG. 1 according to some example embodiments.

FIG. 5 illustrates a block diagram of an example of a recovery module 170 in FIG. 1 according to some example embodiments. Referring to FIG. 5, a recovery module 170 includes an inverse quantization unit 171 and an inverse discrete cosine transformation (IDCT) unit 172. The inverse quantization unit 171 performs the inverse quantization on the spatial converted frame. The IDCT unit 172 performs the IDCT on the inversely quantized frame to provide a recovered frame. The recovered frame is provided to the storage unit 180.

Figure 6:
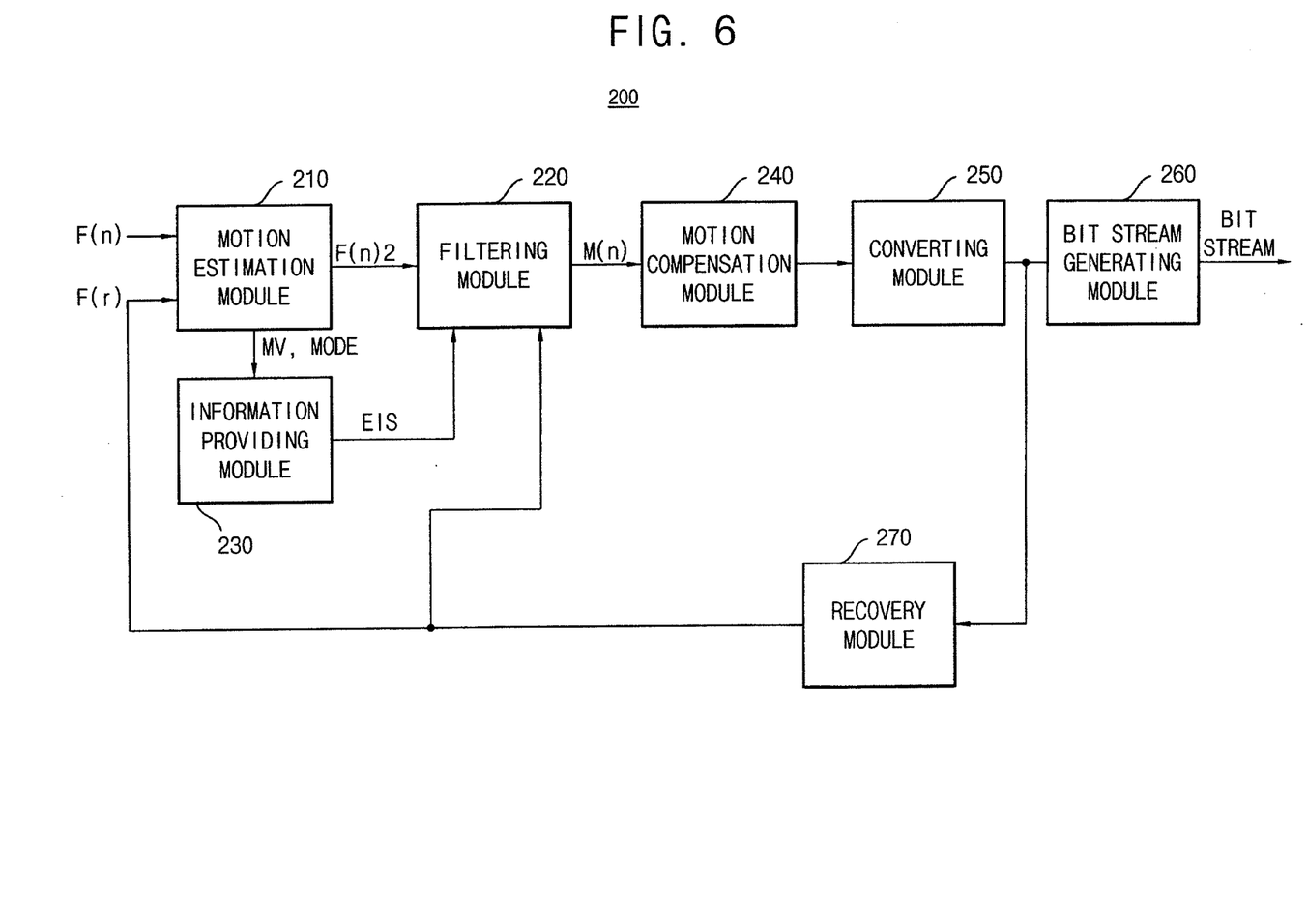
FIG. 6 illustrates a block diagram of a video encoding apparatus according to other example embodiments.

FIG. 6 illustrates a block diagram of a video encoding apparatus 200 according to other example embodiments. Referring to FIG. 6, the video encoding apparatus 200 includes a motion estimation module 210, a filtering module 220, an information providing module 230, a motion compensation module 240, a converting module 250, a bit stream generating module 260, and a recovery module 270.

The architecture and operation of each of the motion estimation module 210, the information providing module 230, the motion compensation module 240, the converting module 250, the bit stream generating module 260, and the recovery module 270 are substantially the same as architecture and operation of the corresponding modules of the video encoding apparatus 100 in FIG. 1. Therefore, detailed description of the motion estimation module 210, the information providing module 230, the motion compensation module 240, the converting module 250, the bit stream generating module 260, and the recovery module 270 will be not be repeated. The video encoding apparatus 200 in FIG. 6 differs from the video encoding apparatus 100 in FIG. 1 in that the filtering module 220 differs from the filtering module 120.

Figure 7:
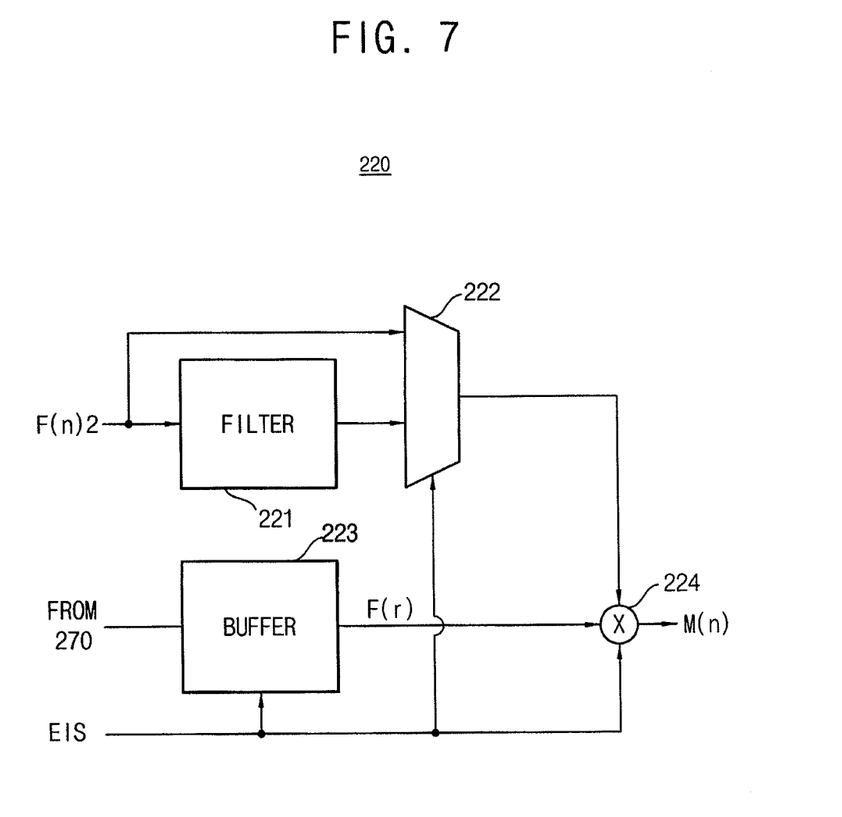
FIG. 7 illustrates an example of the filtering module in FIG. 6 according to some example embodiments.

FIG. 7 illustrates an example of the filtering module 220 in FIG. 6 according to some example embodiments. Referring to FIG. 7, the filtering module 220 includes a two dimensional filter 221, a multiplexer 222, a buffer 223, and a coupler 224.

The two dimensional filter 221 filters the motion-estimated frame F(n)2 in two dimensions. The multiplexer 222 selects one of the motion-estimated frame F(n)2 and an output of the two dimensional filter 221 in response to the encoding information signal EIS. The buffer 223 stores the recovered frame, and selectively provides the recovered frame as the reference frame F(r) according to the encoding information signal EIS. The coupler 224 selectively couples the output of the multiplexer 222 and the reference frame F(r) which is selectively provided, to provide the filtered frame M(n) according to the encoding information signal EIS.

For example, the multiplexer 222 selects the output of the two dimensional filter 221, the buffer 223 does not provide the reference frame F(r), and the coupler 224 provides the output of the two dimensional filter 121 as the filtered frame M(n) when the encoding information signal EIS indicates an intra-mode. That is, the motion compensation module 240 calculates a difference prediction value using adjacent pixels of the macro-block to be encoded and actual pixel values. For example, the multiplexer 222 selects the motion-estimated frame F(n)2, the buffer 223 provides the reference frame F(r), and the coupler 224 provides a frame in which the motion-estimated frame F(n)2 is coupled with the reference frame F(r) as the filtered frame M(n) when the encoding information signal EIS indicates an inter-mode. The motion compensation module 240 calculates a difference between a prediction block using a motion vector generated in the motion estimation module 210 and a current block. That is, the filtering module 220 combined with the motion estimation module 210 operate as a third dimensional noise canceller. The buffer 223 may be shared with other modules in the video encoding apparatus 200.

Figure 8A:
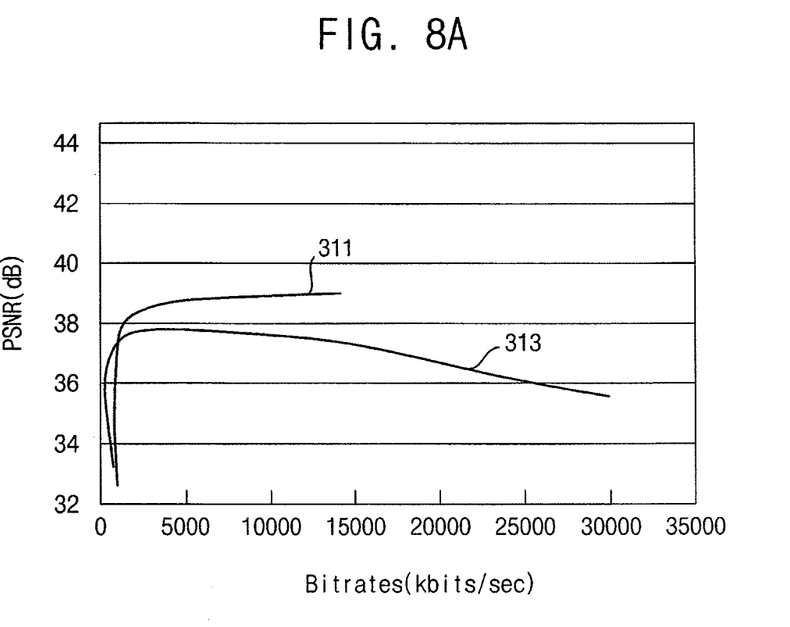
FIGS. 8A and 8B illustrate simulation diagrams of peak signal to noise ratio of the video encoding apparatus according to some example embodiments.
Figure 8B:
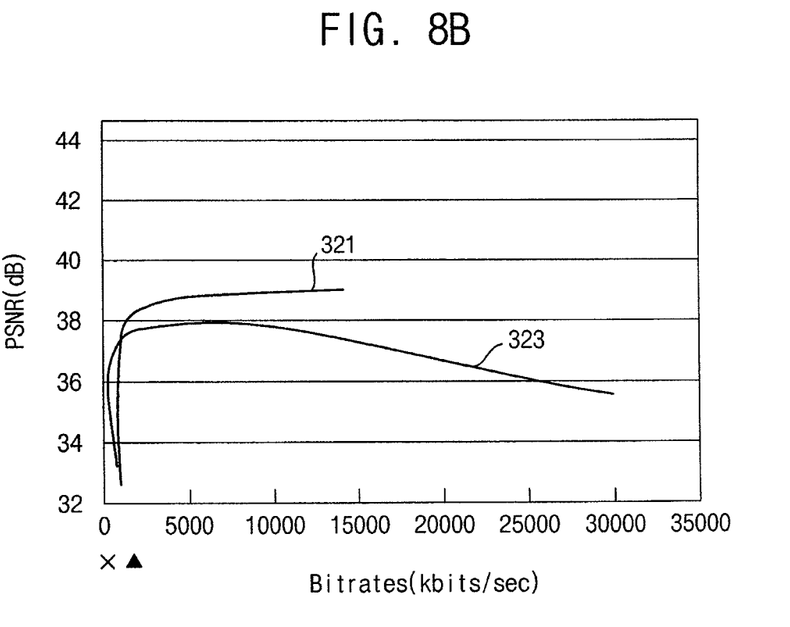

FIGS. 8A and 8B illustrate simulation diagrams of peak signal to noise ratio (PSNR) of the video encoding apparatus according to some example embodiments. FIG. 8A illustrates PSNRs of the video encoding apparatus according to some example embodiments and a conventional video encoding apparatus when an sample image, e.g., a sunflower, including noise is encoded according to intra, predictive, and predictive (IPP) encoding scheme. FIG. 8B illustrates PSNRs of the video encoding apparatus according to example embodiments and the conventional video encoding apparatus when the sample image including noise is encoded according to intra, predictive, and bidirectional (IPB) encoding scheme.

In FIGS. 8A and 8B, reference numerals 311 and 321 indicate the PSNRs of the video encoding apparatus according to some example embodiments and reference numerals 313 and 323 indicate the PSNRs of the conventional video encoding apparatus. Referring to FIGS. 8A and 8B, the PSNR of the some example embodiments does not decrease when the bitrates increase and the video encoding apparatus according to some example embodiments has a relatively higher PSNR.

Figure 9A:
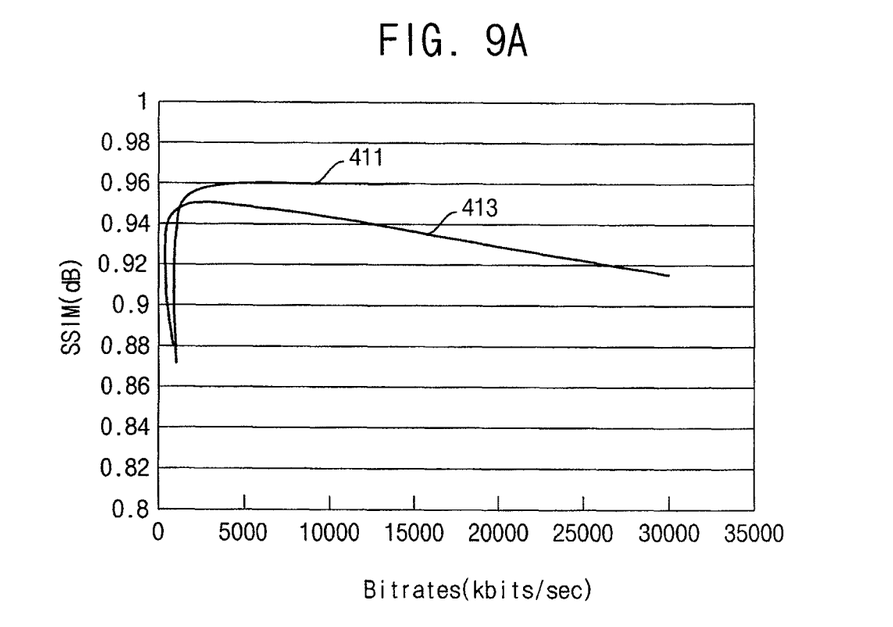
FIGS. 9A and 9B illustrate simulation diagrams of structural similarity index measurement of the video encoding apparatus according to some example embodiments.
Figure 9B:
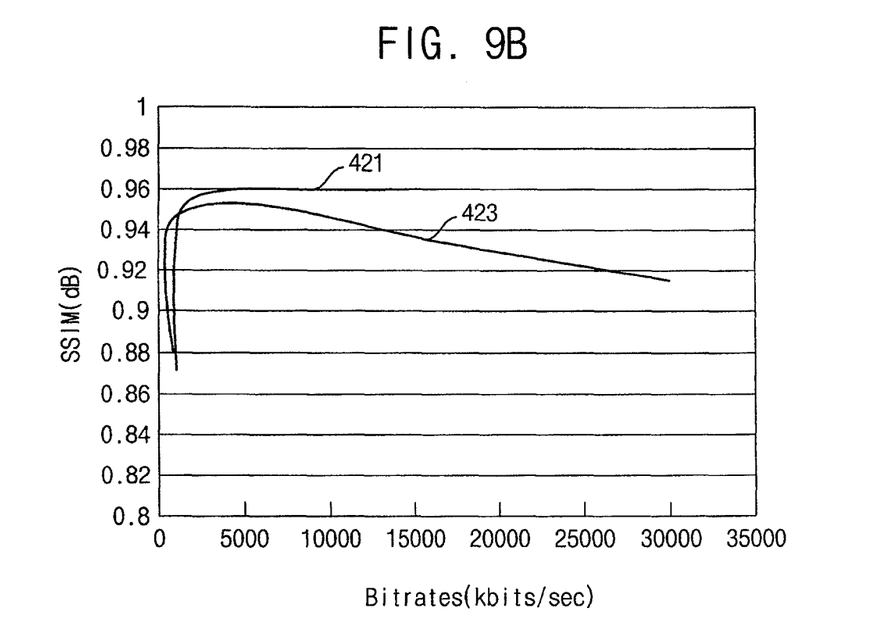

FIGS. 9A and 9B illustrate simulation diagrams of structural similarity index measurement (SSIM) of the video encoding apparatus according to some example embodiments. The SSIM may be criteria illustrating how much an encoded image is similar to a real image. FIG. 9A illustrates SSIMs of the video encoding apparatus according to some example embodiments and a conventional video encoding apparatus when a sample image, e.g., a sunflower, including noise is encoded according to IPP encoding scheme. FIG. 9B illustrates SSIMs of the video encoding apparatus according to example embodiments and the conventional video encoding apparatus when the sample image including noise is encoded according to IPB encoding scheme.

In FIGS. 9A and 9B, reference numerals 411 and 421 indicate the SSIMs of the video encoding apparatus according to some example embodiments and reference numerals 413 and 4323 indicate the SSIMs of the conventional video encoding apparatus. Referring to FIGS. 9A and 9B, the SSIM of the some example embodiments does not decrease when the bitrates increase, and the video encoding apparatus according to some example embodiments has a relatively higher SSIM.

Figure 10:
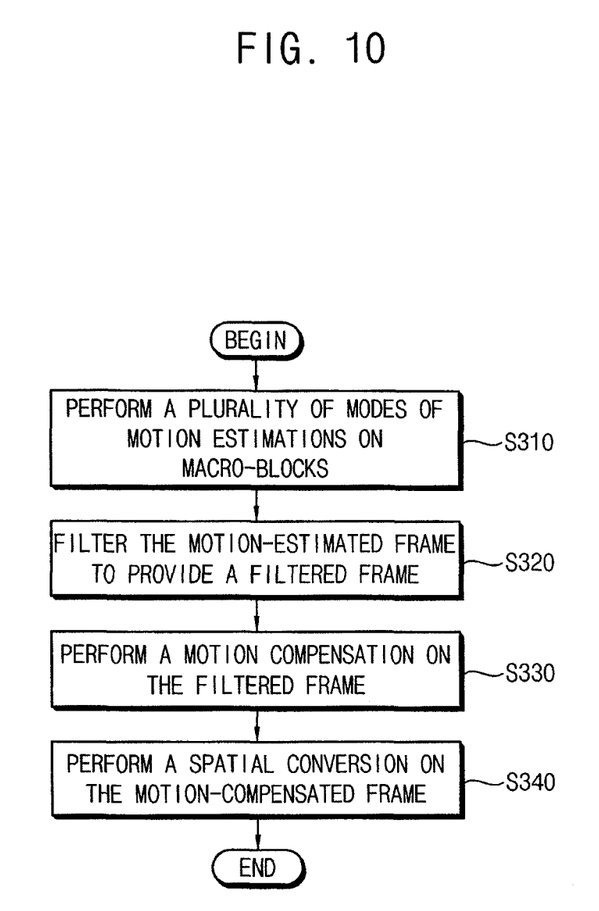
FIG. 10 illustrates a flow chart of a video encoding method according to some example embodiments.

FIG. 10 illustrates a flow chart of a video encoding method according to some example embodiments. Hereinafter, the video encoding method will be described in detail with reference to FIGS. 1 and 10.

A plurality of modes of motion estimations are performed on macro-blocks included in a input frame F(n) by referring to a reference frame F(r) to provide a motion-estimated frame F(n)2 which conforms to a predetermined standard in operation S310. Here, the predetermined standard may be associated with each cost of the plurality of modes of motion estimations preformed on the macro-blocks. The motion-estimated frame F(n)2 is filtered to provide a filtered frame M(n) according to an encoding information signal EIS including motion vectors of the plurality of modes of motion estimations and a mode information of the plurality of modes of motion estimations in operation S320. The encoding information signal EIS may be provided from the information providing module 130 or may be provided externally. A motion compensation is performed on the filtered frame M(n) in operation S330. The spatial conversion is performed on the motion-compensated frame in operation S340. The spatial conversion cancels spatial overlaps in the motion-compensated frame.

As mentioned above, some example embodiments may prevent bit rates from increasing and may prevent the image quality from being degraded without losing bandwidth or increasing processing time by including a filter inside the video encoding apparatus and using additional encoding information.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:
1. A video encoding apparatus, comprising:
 a motion estimation module configured to perform a plurality of modes of motion estimations on macro-blocks included in an input frame and configured to provide a motion-estimated frame which conforms to a predetermined standard associated with cost;
 an information providing module configured to receive motion vectors and mode information of the plurality of modes of motion estimations to provide an encoding information signal including one of the plurality of modes of the motion estimations based on the predetermined standard;

a filtering module configured to filter the motion-estimated frame to selectively provide one of a two-dimensional-filtered motion-estimated frame and a motion-estimated frame coupled with a reference frame as a filtered frame based on information included in the encoding information signal, the filtering module including:
  the two dimensional filter that filters the motion-estimated frame in two dimensions;
  a multiplexer that selects one of the motion-estimated frame and the output of the two dimensional filter based on mode information;
  a switch that selectively provides the reference frame based on the mode information; and
  a coupler that selectively couples the output of the multiplexer and the reference frame which is selectively provided to provide the filtered frame according to the mode information;
a motion compensation module configured to perform a motion compensation on the filtered frame to provide a motion-compensated frame; and
a converting module configured to perform a spatial conversion on the motion-compensated frame, wherein the plurality of modes of motion estimations are performed by referring to the reference frame.

2. The video encoding apparatus as claimed in claim 1, wherein the predetermined standard is associated with each cost of the plurality of modes of motion estimations performed on the macro-blocks, the cost being based on a cost function.

3. The video encoding apparatus as claimed in claim 2, wherein a cost of the mode of motion estimation conforming to the predetermined standard is lower than a cost of other modes of motion estimations.

4. The video encoding apparatus as claimed in claim 1, wherein the motion estimation module includes:
  a motion estimation unit configured to perform the plurality of modes of motion estimations on each of the macro-blocks by referring corresponding blocks of the reference frame to generate corresponding motion vectors; and
  a mode decision unit configured to decide which one of the modes conforms to the predetermined standard.

5. The video encoding apparatus as claimed in claim 4, wherein the encoding information signal includes at least the motion vectors, the mode information, a partition type of the macro-blocks, a type of the macro-blocks, and a quantization parameter of the macro-blocks.

6. The video encoding apparatus as claimed in claim 1, wherein, when the mode information indicates an intra-mode, the multiplexer selects the output of the two dimensional filter, the switch is opened, and the coupler provides output of the two dimensional filter.

7. The video encoding apparatus as claimed in claim 6, wherein, when the mode information indicates an inter-mode, the multiplexer selects the motion-estimated frame, the switch is closed, and the coupler provides a frame in which the motion-estimated frame is coupled with the reference frame as the filtered frame.

8. The video encoding apparatus as claimed in claim 1, wherein the motion estimation module and the filtering module operates as a third-dimensional noise canceller when the motion estimation module and the filtering module are coupled to each other.

9. The video encoding apparatus as claimed in claim 1, wherein the filtering module includes:
  the two dimensional filter that filters the motion-estimated frame in two dimensions;
  a multiplexer that selects one of the motion-estimated frame and the output of the two dimensional filter based on mode information;
  a buffer that stores the reference frame to selectively provide the stored reference frame based on the mode information; and
  a coupler that selectively couples the output of the multiplexer and the reference frame which is selectively provided to provide the filtered frame according to the encoding information signal.

10. The video encoding apparatus as claimed in claim 1, wherein the converting module includes:
  a discrete cosine transformation (DCT) unit that performs DCT on the motion-estimated frame to generate a DCT coefficient; and
  a quantization unit that performs quantization on the DCT coefficient to generate a quantization coefficient.

11. The video encoding apparatus as claimed in claim 1, further comprising:
  a recovery module configured to recover the spatial-converted frame to provide a recovered frame; and
  a storage unit that stores the recovered frame to provide the stored recovered frame as the reference frame.

12. The video encoding apparatus as claimed in claim 11, wherein the recovery module includes:
  an inverse quantization unit that performs the inverse quantization on the spatial converted frame; and
  an inverse discrete cosine transformation that performs the inverse discrete cosine transformation on the inversely quantized frame to provide the recovered frame.

13. A video encoding method, comprising:
performing a plurality of modes of motion estimations on macro-blocks included in a input frame by referring to a reference frame to provide a motion-estimated frame which conforms to a predetermined standard associated with cost;
applying the motion-estimated frame to a filtering module that selectively provides one of a two-dimensional-filtered motion-estimated frame and a motion estimated frame coupled with the reference frame as a filtered frame according to an encoding information signal including motion vectors of the plurality of modes of motion estimations and a mode information of the plurality of modes of motion estimations, the mode information indicating one of the plurality of modes of the motion estimations based on the predetermined standard, wherein applying includes
  filtering the motion-estimated frame in two dimensions;
  selecting, using a multiplexer, one of the motion-estimated frame and the output of the two dimensional filter based on mode information;
  selectively providing the reference frame based on the mode information; and
  selectively coupling the output of the multiplexer and the reference frame which is selectively provided to provide the filtered frame according to the mode information;
performing a motion compensation on the filtered frame; and
performing a spatial conversion on the motion-compensated frame, wherein the plurality of modes of motion estimations are performed by referring to the reference frame.

14. The video encoding method as claimed in claim 13, wherein the predetermined standard is associated with each cost of the plurality of modes of motion estimations preformed on the macro-blocks, the cost being based on a cost function.

15. The video encoding method as claimed in claim 13, performing the spatial conversion includes cancelling spatial overlaps in the motion-compensated frame.

* * * * *